United States Patent
Wu et al.

(10) Patent No.: US 11,397,369 B2
(45) Date of Patent: Jul. 26, 2022

(54) DRIVING MECHANISM

(71) Applicant: TDK TAIWAN CORP., Taoyuan (TW)

(72) Inventors: Fu-Yuan Wu, Taoyuan (TW);
Sin-Jhong Song, Taoyuan (TW)

(73) Assignee: TDK TAIWAN CORP., Taoyuan (TW)

(*) Notice: Subject to any disclaimer, the term of this patent is extended or adjusted under 35 U.S.C. 154(b) by 348 days.

(21) Appl. No.: 16/778,426

(22) Filed: Jan. 31, 2020

(65) Prior Publication Data
US 2020/0249422 A1 Aug. 6, 2020

Related U.S. Application Data

(60) Provisional application No. 62/799,886, filed on Feb. 1, 2019.

(51) Int. Cl.
*G02B 7/09* (2021.01)
*G02B 27/64* (2006.01)
(Continued)

(52) U.S. Cl.
CPC .................. *G03B 9/06* (2013.01); *G02B 7/08* (2013.01); *G02B 7/09* (2013.01); *G02B 27/646* (2013.01);
(Continued)

(58) Field of Classification Search
CPC .......... G02B 19/0095; G02B 2027/011; G02B 2027/0174; G02B 2027/0198; G02B 21/0004; G02B 21/0028; G02B 21/0048; G02B 21/0064; G02B 21/0076; G02B 21/0088; G02B 21/04; G02B 21/06; G02B 21/08; G02B 21/086; G02B 21/16; G02B 21/18; G02B 21/20; G02B 21/30; G02B 21/36; G02B 23/06; G02B 23/10;
(Continued)

(56) References Cited

U.S. PATENT DOCUMENTS

2017/0176766 A1* 6/2017 Sue .................. G02B 27/646
2019/0230262 A1* 7/2019 Wang .................. G03B 13/36
(Continued)

FOREIGN PATENT DOCUMENTS

WO    WO-2015005711 A  * 1/2015 .......... G02B 27/646

*Primary Examiner* — Collin X Beatty
*Assistant Examiner* — Grant A Gagnon
(74) *Attorney, Agent, or Firm* — Muncy, Geissler, Olds & Lowe, P.C.

(57) ABSTRACT

A driving mechanism is provided, including a fixed portion, a movable portion, a driving assembly and a buffering element. The movable portion is movably connected to the fixed portion for holding an optical element having a main axis. The driving assembly is disposed in the fixed portion for moving the movable portion relative to the fixed portion. The buffering element is disposed between the movable portion and the fixed portion, wherein a stopping assembly is disposed on the fixed portion and/or the movable portion to limit the range of motion of the movable portion relative to the fixed portion, the buffering element is not in contact with the movable portion or the fixed portion when the movable portion is static, and the hardness of the buffering element is less than the hardness of the stopping assembly.

15 Claims, 13 Drawing Sheets

(51) Int. Cl.
  *G03B 9/06* (2021.01)
  *G03B 13/36* (2021.01)
  *G03B 5/06* (2021.01)
  *G02B 7/08* (2021.01)
  *H04N 5/232* (2006.01)
  *H04N 5/225* (2006.01)

(52) U.S. Cl.
  CPC ............... *G03B 5/06* (2013.01); *G03B 13/36* (2013.01); *G03B 2205/0023* (2013.01); *G03B 2205/0069* (2013.01); *H04N 5/2257* (2013.01); *H04N 5/23287* (2013.01)

(58) Field of Classification Search
  CPC ............... G02B 23/125; G02B 23/165; G02B 23/2461; G02B 23/2469; G02B 23/2492; G02B 23/26; G02B 25/00; G02B 26/001; G02B 26/023; G02B 26/04; G02B 26/085; G02B 26/106; G02B 26/126; G02B 27/0012; G02B 27/0056; G02B 27/0062; G02B 27/022; G02B 27/023; G02B 27/024; G02B 27/027; G02B 27/028; G02B 27/04; G02B 27/08; G02B 27/0933; G02B 27/0944; G02B 27/0988; G02B 27/10; G02B 27/1046; G02B 27/1066; G02B 27/1073; G02B 27/149; G02B 27/16; G02B 27/281; G02B 27/4211; G02B 27/48; G02B 27/56; G02B 3/0018; G02B 3/005; G02B 3/08; G02B 3/10; G02B 30/10; G02B 30/37; G02B 30/40; G02B 30/56; G02B 5/122; G02B 5/18; G02B 5/1809; G02B 5/1895; G02B 5/22; G02B 5/28; G02B 5/281; G02B 5/3083; G02B 5/32; G02B 6/0001; G02B 6/0033; G02B 6/0038; G02B 6/0056; G02B 6/032; G02B 6/04; G02B 6/102; G02B 6/266; G02B 6/2817; G02B 6/29305; G02B 6/2931; G02B 6/29358; G02B 6/29398; G02B 6/32; G02B 6/3512; G02B 6/3524; G02B 6/3526; G02B 6/3556; G02B 6/3558; G02B 6/356; G02B 6/3564; G02B 6/357; G02B 6/3572; G02B 6/3576; G02B 6/3584; G02B 6/3586; G02B 6/3604; G02B 6/3616; G02B 6/3628; G02B 6/3636; G02B 6/366; G02B 6/383; G02B 6/3843; G02B 6/385; G02B 6/3851; G02B 6/3853; G02B 6/3859; G02B 6/3877; G02B 6/3885; G02B 6/3891; G02B 6/4208; G02B 6/4214; G02B 6/4215; G02B 6/4227; G02B 6/4231; G02B 6/4234; G02B 6/4236; G02B 6/4239; G02B 6/4245; G02B 6/4246; G02B 6/425; G02B 6/4251; G02B 6/4274; G02B 6/4277; G02B 6/4428; G02B 7/001; G02B 7/1815; G02B 7/24; G02B 7/343; G02B 7/346; G02B 9/16; G02B 9/22; G02B 9/24; G02B 9/30; G02B 9/36; G02B 9/38; G02B 9/42; G02B 9/44; G02B 9/56; H04N 5/2254; H04N 5/2257; H04N 5/2253; H04N 5/23287; H04N 5/232123; H04N 5/232212; H04N 5/23248; H04N 5/2252; H04N 5/23296; H04N 5/23209; H04N 5/23258; H04N 5/232; H04N 5/225; H04N 5/232122; H04N 9/3141; H04N 9/317; H04N 5/2251; H04N 5/232933; H04N 5/23245; H04N 5/22521; H04N 5/2258; H04N 5/2259; H04N 5/2328; H04N 5/232127; H04N 5/232945; H04N 1/03; H04N 5/23216; H04N 5/23218; H04N 5/335; H04N 17/002; H04N 5/23264; H04N 1/193; H04N 2005/2255; H04N 5/238; H04N 13/239; H04N 2101/00; H04N 5/23293; H04N 5/232935; H04N 13/296; H04N 5/2256; H04N 5/232125; H04N 5/23219; H04N 5/23238; H04N 5/23283; H04N 5/247; H04N 5/7408; H04N 9/3105; H04N 9/3185; H04N 1/0402; H04N 2201/02431; H04N 5/00; H04N 5/2171; H04N 5/2224; H04N 5/23203; H04N 5/23206; H04N 5/23232; H04N 5/23241; H04N 5/232939; H04N 5/2353; H04N 5/33; H04N 7/183; H04N 9/04557; H04N 1/02409; H04N 1/036; H04N 1/0408; H04N 1/1013; H04N 1/1017; H04N 1/1135; H04N 13/207; H04N 2201/02441; H04N 2201/02458; H04N 2201/0446; H04N 5/222; H04N 5/22525; H04N 5/232411; H04N 5/232941; H04N 5/36961; H04N 5/374; H04N 1/0426; H04N 1/0432; H04N 1/0435; H04N 1/0455; H04N 1/0607; H04N 1/0635; H04N 1/12; H04N 13/218; H04N 13/289; H04N 13/305; H04N 13/324; H04N 13/337; H04N 13/363; H04N 2007/145; H04N 21/4122; H04N 2201/0081; H04N 2201/02416; H04N 2201/0242; H04N 2201/02429; H04N 2201/02433; H04N 2201/02447; H04N 2201/02474; H04N 2201/02485; H04N 2201/0444; H04N 2201/0471; H04N 2201/04796; H04N 5/23222; H04N 5/23229; H04N 5/23254; H04N 5/23261; H04N 5/2351; H04N 5/332; H04N 5/349; H04N 5/35721; H04N 5/372; H04N 5/74; H04N 5/7416; H04N 5/7458; H04N 7/142; H04N 9/097; H04N 9/28; H04N 9/3152; H04N 9/3155; H04N 9/3161; H04N 1/00002; H04N 1/00013; H04N 1/00031; H04N 1/00045; H04N 1/00063; H04N 1/00087; H04N 1/024; H04N 1/02418; H04N 1/0249; H04N 1/028; H04N 1/02815; H04N 1/02865; H04N 1/0305; H04N 1/0452; H04N 1/047; H04N 1/0473; H04N 1/06; H04N 1/10; H04N 1/1008; H04N 1/1021; H04N 1/1026; H04N 1/1056; H04N 1/113; H04N 1/121; H04N 1/1911; H04N 1/195; H04N 1/31; H04N 1/32128; H04N 1/393; H04N 1/40056; H04N 1/401; H04N 1/486; H04N 1/56; H04N 13/10; H04N 13/161; H04N 13/189; H04N 13/194; H04N 13/211; H04N 13/229; H04N 13/232; H04N 13/236; H04N 13/246; H04N 13/254; H04N 13/257; H04N 13/282; H04N 13/286; H04N 13/293; H04N 13/307; H04N 13/322; H04N 13/334; H04N 13/339; H04N 13/341; H04N 13/344; H04N 13/365; H04N 13/398; H04N 17/00; H04N 17/04; H04N 19/597; H04N 2005/7466; H04N 2013/0081; H04N 21/41407; H04N 21/42208; H04N 21/4223; H04N 21/4334; H04N 21/435; H04N 21/43637; H04N 21/4424; H04N 2201/02418; H04N 2201/02449; H04N 2201/02452; H04N 2201/02491; H04N 2201/02495; H04N 2201/0408; H04N 2201/0422; H04N 2201/0436; H04N 2201/0448; H04N 2201/04717; H04N 2201/04744; H04N 2201/04755; H04N 2201/0476; H04N 2201/3204; H04N 2201/3277; H04N 2213/001; H04N 3/08; H04N 3/1587; H04N 5/04; H04N 5/06; H04N 5/08; H04N 5/22541; H04N 5/228; H04N 5/232133; H04N 5/23235; H04N 5/23299; H04N 5/2354; H04N 5/243; H04N 5/2624; H04N 5/2628; H04N 5/3532; H04N 5/369; H04N 5/3765; H04N 5/44; H04N 5/46; H04N 5/66; H04N 5/7441; H04N 5/7475; H04N 7/0122; H04N 7/015; H04N 7/148; H04N 7/181; H04N 9/04515; H04N 9/04561; H04N 9/3102; H04N 9/3114; H04N 9/3129; H04N 9/3144; H04N 9/3147; H04N 9/3167; H04N 9/3173; H04N 9/3194; H04N 9/8233; G03B 3/10; G03B 5/00; G03B 17/14; G03B 13/36; G03B 17/04; G03B 2205/0069; G03B 17/12; G03B 3/02; G03B 2205/0046; G03B 2205/0053; G03B 17/02; G03B 3/00; G03B 2205/0015; G03B 2205/0007; G03B 13/34; G03B 17/00; G03B 21/142; G03B 5/02; G03B 13/32; G03B 2205/0061; G03B 2217/002; G03B 2205/00; G03B 19/18; G03B 2205/0076; G03B 5/06; G03B 17/17; G03B 21/145; G03B 2217/005; G03B 2205/0023; G03B 5/04; G03B 17/565; G03B 21/28; G03B 7/10; G03B 11/043; G03B 13/20; G03B 43/00; G03B 13/18; G03B 19/12; G03B 11/00; G03B 17/08; G03B 21/53; G03B 2205/0084; G03B 2217/18; G03B 29/00; G03B 9/06; G03B 15/00; G03B 17/28; G03B 17/561; G03B 2206/00; G03B 7/097; G03B 9/24; G03B 17/18; G03B 17/56; G03B 21/11; G03B 21/10; G03B 21/115; G03B 21/147; G03B 3/12; G03B 33/00; G03B 35/10; G03B 9/14; G03B 9/22; G03B 11/04; G03B 13/02; G03B 13/06; G03B 17/566; G03B 19/04; G03B 21/14; G03B 21/2066; G03B 21/208; G03B 2217/007; G03B 37/02; G03B 13/00; G03B 15/006; G03B 21/00; G03B 2205/003; G03B 2219/045; G03B 27/326; G03B 27/522; G03B 27/526; G03B 3/06; G03B 35/20; G03B 7/083; G03B 9/02; G03B 9/10; G03B 17/26; G03B 17/48; G03B 17/55; G03B 21/001; G03B 21/16; G03B 21/2046; G03B 21/32; G03B 2205/0038; G03B 27/32; G03B 27/34; G03B 27/52; G03B 27/54; G03B 27/58; G03B 30/00; G03B 35/00; G03B 35/08; G03B 7/08; G03B 7/16; G03B 9/04; G03B 1/00; G03B 1/48; G03B 11/045; G03B 13/10; G03B 15/03; G03B 15/06; G03B 15/08; G03B 15/14; G03B 15/16; G03B 17/045; G03B 17/06; G03B 17/20; G03B 17/425; G03B 17/44; G03B 17/52; G03B 17/54; G03B 17/563; G03B 19/00; G03B 19/14; G03B 19/22; G03B 21/006; G03B 21/118; G03B 21/12; G03B 21/132; G03B 21/134; G03B 21/20; G03B 21/2013; G03B 21/2026; G03B 21/2033; G03B 21/204; G03B 21/22; G03B 21/43; G03B 2217/00; G03B 23/00; G03B 25/02; G03B 27/10; G03B 27/323; G03B 27/36; G03B 27/38; G03B 27/42; G03B 27/44; G03B 27/462; G03B 27/528; G03B 27/60; G03B 27/62; G03B 27/6271; G03B 27/72; G03B 3/04; G03B 31/00; G03B 33/04; G03B 33/08; G03B 35/26; G03B 41/00; G03B 41/12; G03B 5/08; G03B 7/02; G03B 7/06; G03B 7/09908; G03B 7/12; G03B 7/18; G03B 7/20; G03B 9/00; G03B 9/07; G03B 9/08; G03B 9/20; G03B 9/26; G03B 9/36
USPC .......................................................... 359/823
See application file for complete search history.

(56) References Cited

U.S. PATENT DOCUMENTS

2020/0209516 A1\* 7/2020 Hu ..................... H04N 5/2254
2020/0249424 A1\* 8/2020 Ho ........................ G02B 7/09

\* cited by examiner

DRIVING MECHANISM

CROSS-REFERENCE TO RELATED APPLICATIONS

The present application claims priority to U.S. Provisional Patent Application No. 62/799,886, filed on Feb. 1, 2019, which are incorporated by reference herein in their entirety.

BACKGROUND OF THE DISCLOSURE

Field of the Disclosure

The present disclosure relates to a driving mechanism.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choices for consumers.

Electronic devices that have image-capturing or video-recording functions normally include a driving mechanism to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the driving mechanism and how to increase its durability has become an important issue. Furthermore, resonance may happen when the driving mechanism is operating, so the performance of the driving mechanism may be affected.

BRIEF SUMMARY OF THE DISCLOSURE

A driving mechanism is provided, including a fixed portion, a movable portion, a driving assembly and a buffering element. The movable portion is movably connected to the fixed portion for holding an optical element having a main axis. The driving assembly is disposed in the fixed portion for moving the movable portion relative to the fixed portion. The buffering element is disposed between the movable portion and the fixed portion, wherein a stopping assembly is disposed on the fixed portion and/or the movable portion to limit the range of motion of the movable portion relative to the fixed portion, the buffering element is not in contact with the movable portion or the fixed portion when the movable portion is static, and the stopping assembly is harder than the buffering element.

In some embodiments, the stopping assembly and the buffering element include resin, and the hardness of the stopping assembly is different than the hardness of the buffering element. In some embodiments, the stopping assembly includes a first stopping element and a second stopping element. The first stopping element is disposed on the movable portion. The second stopping element is disposed on the fixed portion. In the first direction, the buffering element partially overlaps the fixed portion and the movable portion. The buffering element is disposed on the fixed portion. The shortest distance between the first stopping element and the second stopping element is greater than the shortest distance between the buffering element and the movable portion. In some embodiments, the buffering element is disposed on the movable portion, and the shortest distance between the first stopping element and the second stopping element is greater than the shortest distance between the buffering element and the fixed portion. In some embodiments, the fixed portion further includes a case and a bottom. The case includes a top plate and a sidewall that extends from the edges of the top plate along the main axis. The bottom includes a column that extends to the top plate. The buffering element is disposed between the column and the movable portion, and the bottom is harder than the buffering element.

In some embodiments, the fixed portion further includes a case and a bottom. The case includes a top plate and a sidewall that extends from the edges of the top plate along the main axis. The bottom is affixed to the case. The buffering element is disposed between the sidewall and the movable portion. The buffering element includes resin. The sidewall includes metal. The sidewall is harder than the buffering element. In some embodiments, the fixed portion further includes a case and a bottom affixed to the case. The case includes a top plate and a sidewall that extends from the edges of the top plate along the main axis, wherein the top plate has an opening. The case further includes an inner sidewall extending from an edge of the opening to the movable portion. The buffering element includes resin, the inner sidewall includes metal, and the hardness of the buffering element is less than the hardness of the inner sidewall. The inner sidewall and the buffering element are arranged along the main axis.

In some embodiments, the driving mechanism further includes a position sensor, wherein the buffering element is disposed between the position sensor and the movable portion, or it is disposed between the position sensor and the fixed portion. In some embodiments, the buffering element is in direct contact with the position sensor, and a distance is formed between the buffering element and either the fixed portion or the movable portion when the movable portion is static. In some embodiments, the buffering element is in direct contact with the fixed portion or the movable portion, and a distance is formed between the buffering element and the position sensor when the movable portion is static.

In some embodiments, the buffering element includes: a first buffering element disposed on the fixed portion; and a second buffering element disposed on the movable portion, wherein a distance is formed between the fixed buffering element and the second buffering element. In some embodiments, first buffering element partially overlaps the second buffering element in a direction that is perpendicular to the main axis. In some embodiments, the first buffering element does not overlap the second buffering element in a direction that is perpendicular to the main axis. In some embodiments, the driving mechanism further includes a resilient element connecting the movable portion and the fixed portion, and the buffering element is disposed on the resilient element.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE DISCLOSURE

Figure 1:
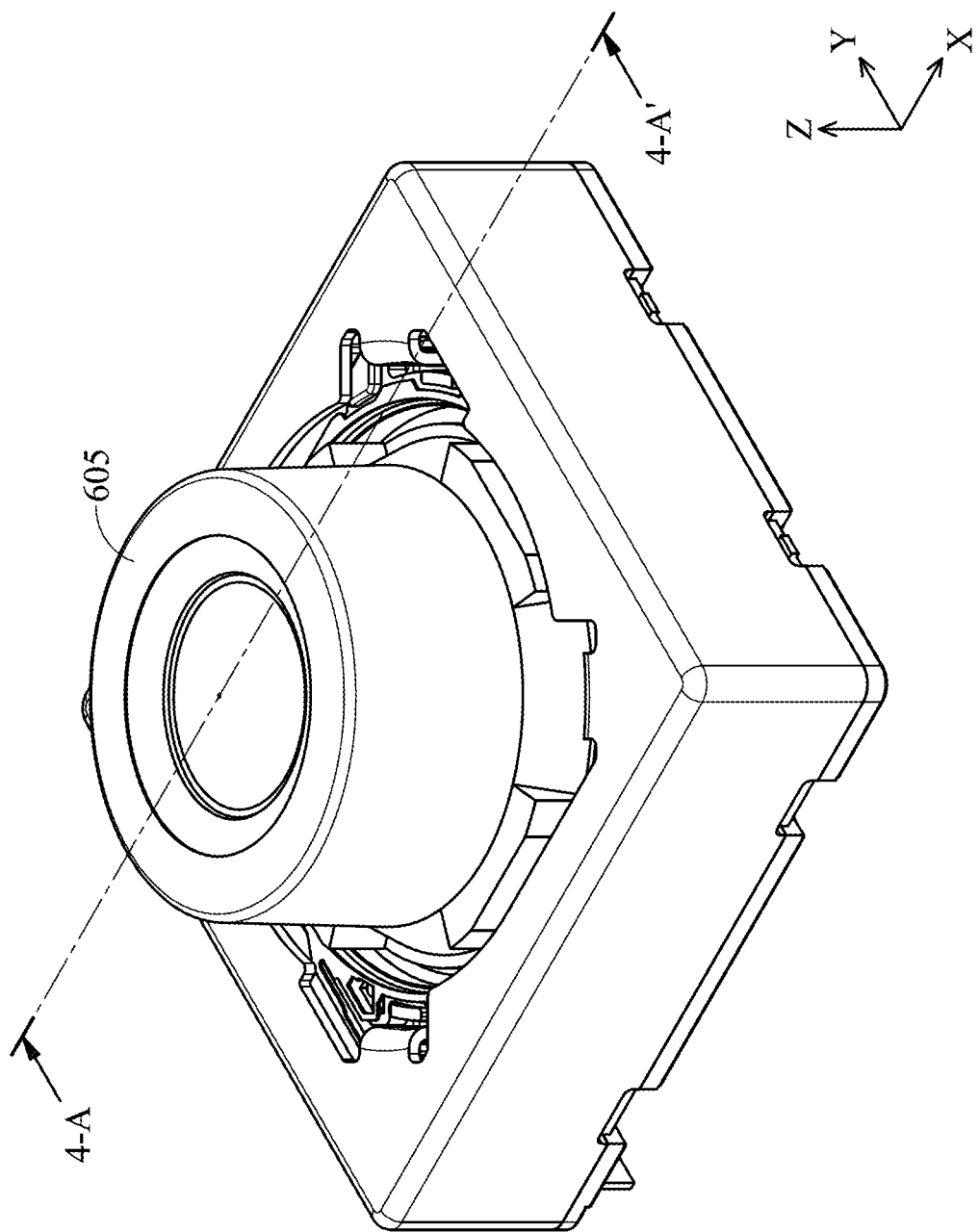
FIG. 1 is a perspective view of a driving mechanism in some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 2:
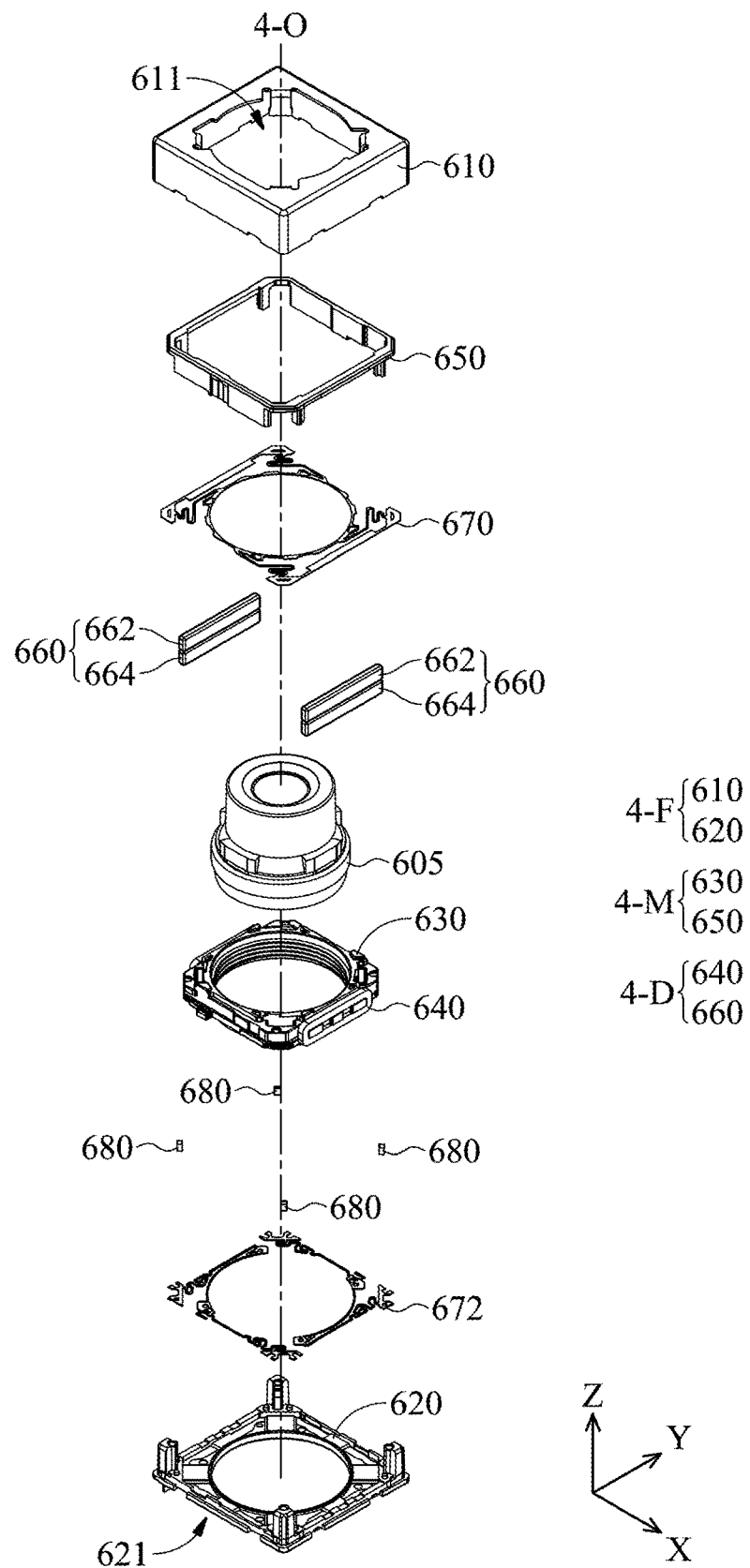
FIG. 2 is an exploded view of the driving mechanism.
Figure 3:
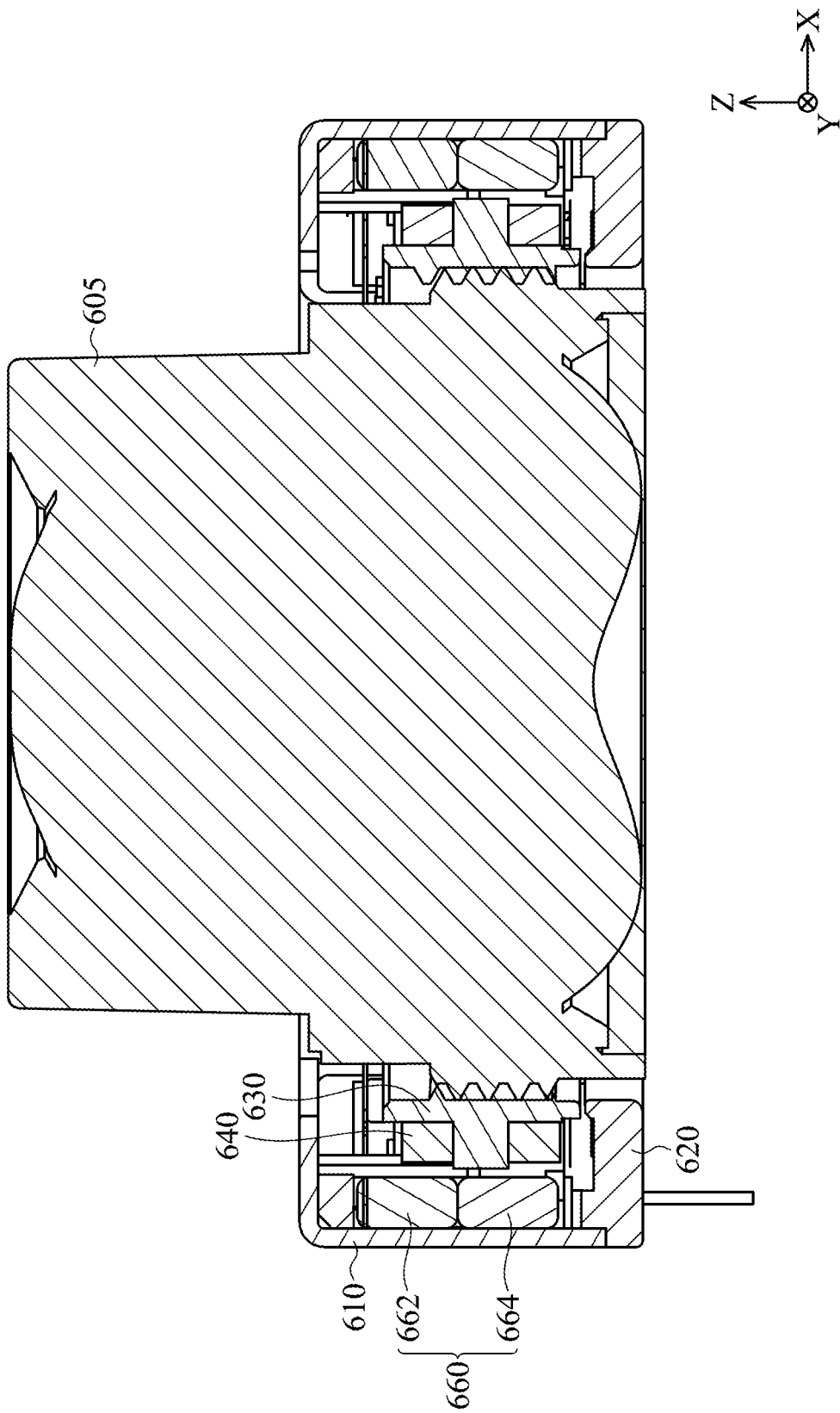
FIG. 3 is a cross-sectional view illustrated along a line 4-A-4-A' in FIG. 1.

Refer to FIGS. 1 to 3, wherein FIG. 1 is a perspective view of the driving mechanism 701 in some embodiments of the present disclosure, FIG. 2 is an exploded view of the driving mechanism 701, and FIG. 3 is a cross-sectional view illustrated along the line 4-A-4-A' in FIG. 1. As shown in FIGS. 1 to 3, the driving mechanism 701 mainly includes a case 610, a base 620, a holder 630, a driving coil 640, a frame 650, a plurality of magnetic elements 660 (includes a first magnetic element 662 and a second magnetic element 664), a first resilient element 670, a second resilient element 672, and a plurality of buffering elements 680 in this embodiment. The driving mechanism 701 may drive an optical element 605 to move for achieving auto focus (AF) or optical image stabilization (OIS).

The case 610 and the bottom 620 may be called as a fixed portion 4-F, and the holder 630 and the frame 650 may be called as a movable portion 4-M. The movable portion 4-M is movably connected to the fixed portion 4-F, in other words, the movable portion 4-M may move relative to the fixed portion 4-F. Furthermore, the driving coil 640 and the magnetic element 660 may be called as a driving assembly 4-D for moving the movable portion 4-M relative to the fixed portion 4-F. Moreover, the buffering element 680 may be disposed between the movable portion 4-M and the fixed portion 4-F, have a distance to the movable portion 4-M or the fixed portion 4-F, and in contact with the other of the movable portion 4-M or the fixed portion 4-F (such as being in contact with the movable portion 4-M and having a distance to the fixed portion 4-F, or being in contact with the fixed portion 4-F and having a distance to the movable portion 4-M) for buffering the movement of the movable portion 4-M relative to the fixed portion 4-F.

The case 610 and the bottom 620 may be combined with each other to form a case of the driving mechanism 701. For example, the bottom 620 may be affixed to the case 610. It should be noted that a case opening 611 and a bottom opening 621 are formed on the case 610 and the bottom 620, respectively. The center of the case opening 611 corresponds to a main axis 6-O of the optical element 605, the bottom opening 621 corresponds to an image sensor (not shown) outside the driving mechanism 701. As a result, the optical element 605 disposed in the driving mechanism 701 can perform image focusing with the image sensor along the main axis 6-O.

The holder 630 has a through hole, and the optical element 605 may be fixed in the through hole. The driving coil 640 may be disposed on the outer surface of the holder 630. The magnetic element 660 may be affixed to the frame 650 or movable relative to the frame 650. In this embodiment, the magnetic element 660 may be a multipolar magnet which includes a first magnetic element 662 and a second magnetic element 664 having opposite magnetic pole directions. In this embodiment, the driving coil 640 may be capsule-shaped and disposed on a side of the holder 630 which corresponds to the first magnetic element 662 and the second magnetic element 664. Specifically, a magnetic force may be generated by the interaction between the magnetic element 660 and the driving coil 640 to move the holder 630 along the direction of the main axis 6-O relative to the frame 650 to achieve rapid focusing.

In this embodiment, the holder 630 and the optical element 605 disposed therein are movably disposed in the frame 650. More specifically, the holder 630 may be connected to and suspended in the frame 650 by the first resilient element 670 and the second resilient element 672 made of a metal material, for example (FIG. 3). When current is applied to the driving coil 640, the driving coil 640 can act with the magnetic field of the magnetic element 660 to generate an electromagnetic force to move the holder 630 and the optical element 605 along the main axis 6-O relative to the frame 650 to achieve auto focusing.

In some embodiments, additional circuits may be provided on the bottom 620 and be electrically connected to electronic elements disposed inside or outside the driving mechanism 701 to achieve auto focus or optical image stabilization. Electrical signal may be transferred by the circuits on the bottom 620 to the driving coil 640 through the first resilient element 670 or the second resilient element 672, for controlling the movement of the holder 630 in X, Y, or Z directions. The second resilient element 672 may be assembled with the circuits on the bottom 620 by soldering or laser welding to allow the driving coil 640 to connect to external circuits.

Furthermore, in some embodiments, a plurality of additional driving coils (not shown) may be embedded in the bottom 620 to interact with the first magnetic element 662 or the second magnetic element 664 to move the holder 630. Driving forces having different directions may be generated when the driving coil 640 and the additional driving coil in the bottom 620 interact with the magnetic element 660 to perform auto focus or optical image stabilization.

Figure 4:
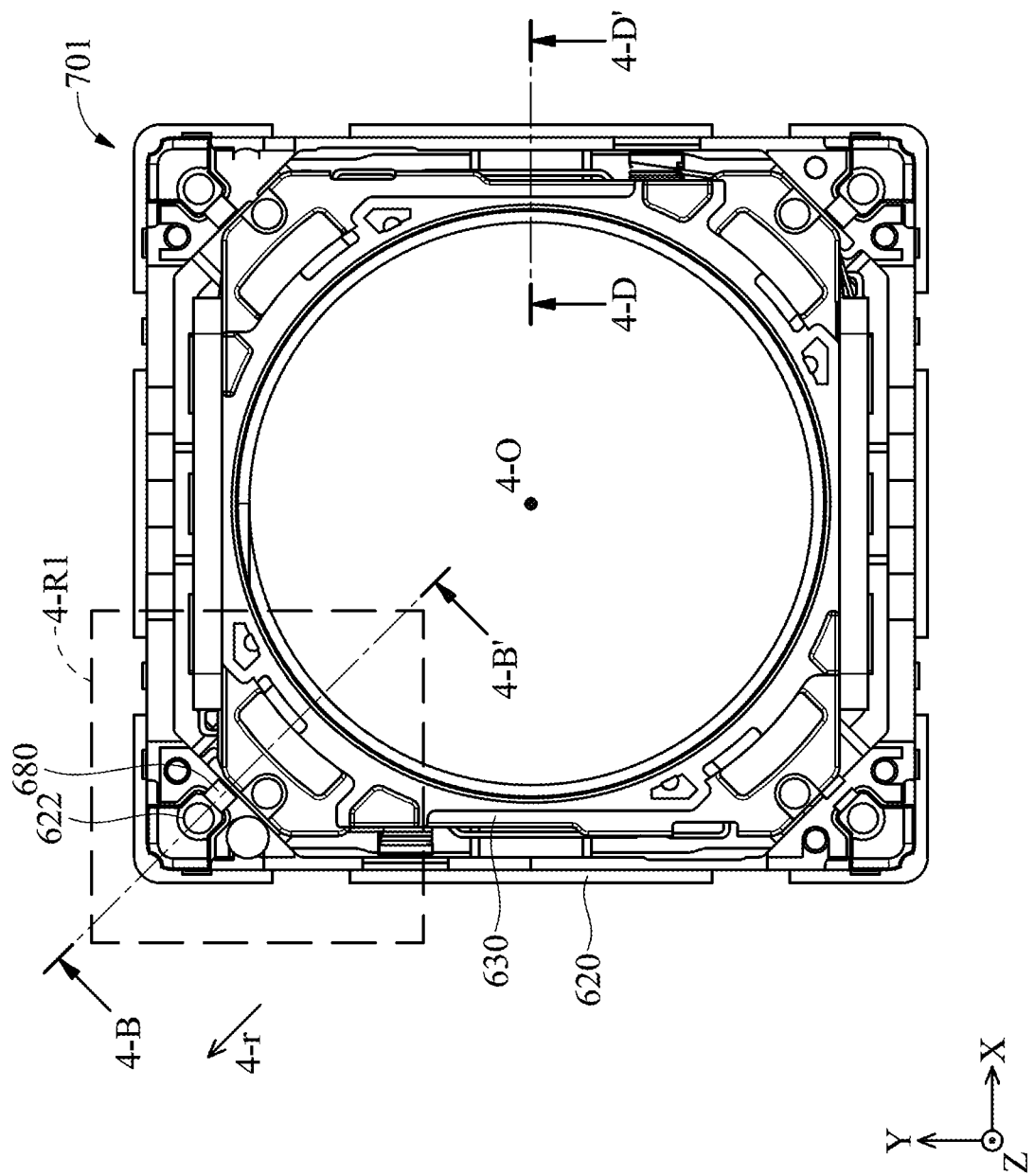
FIG. 4 is a top view of some elements of the driving mechanism.
Figure 5:
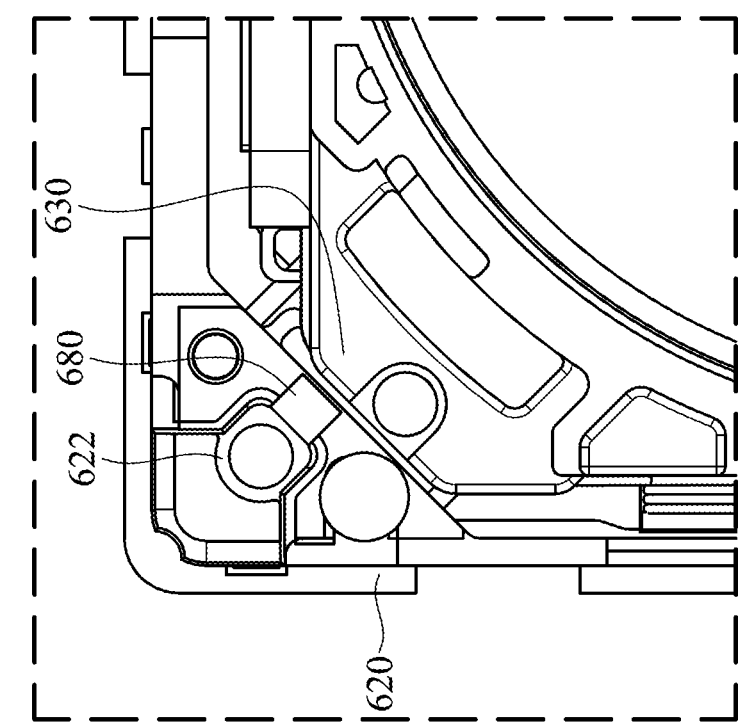
FIG. 5 is an enlarged view of the area 4-R1 in FIG. 4.
Figure 6:
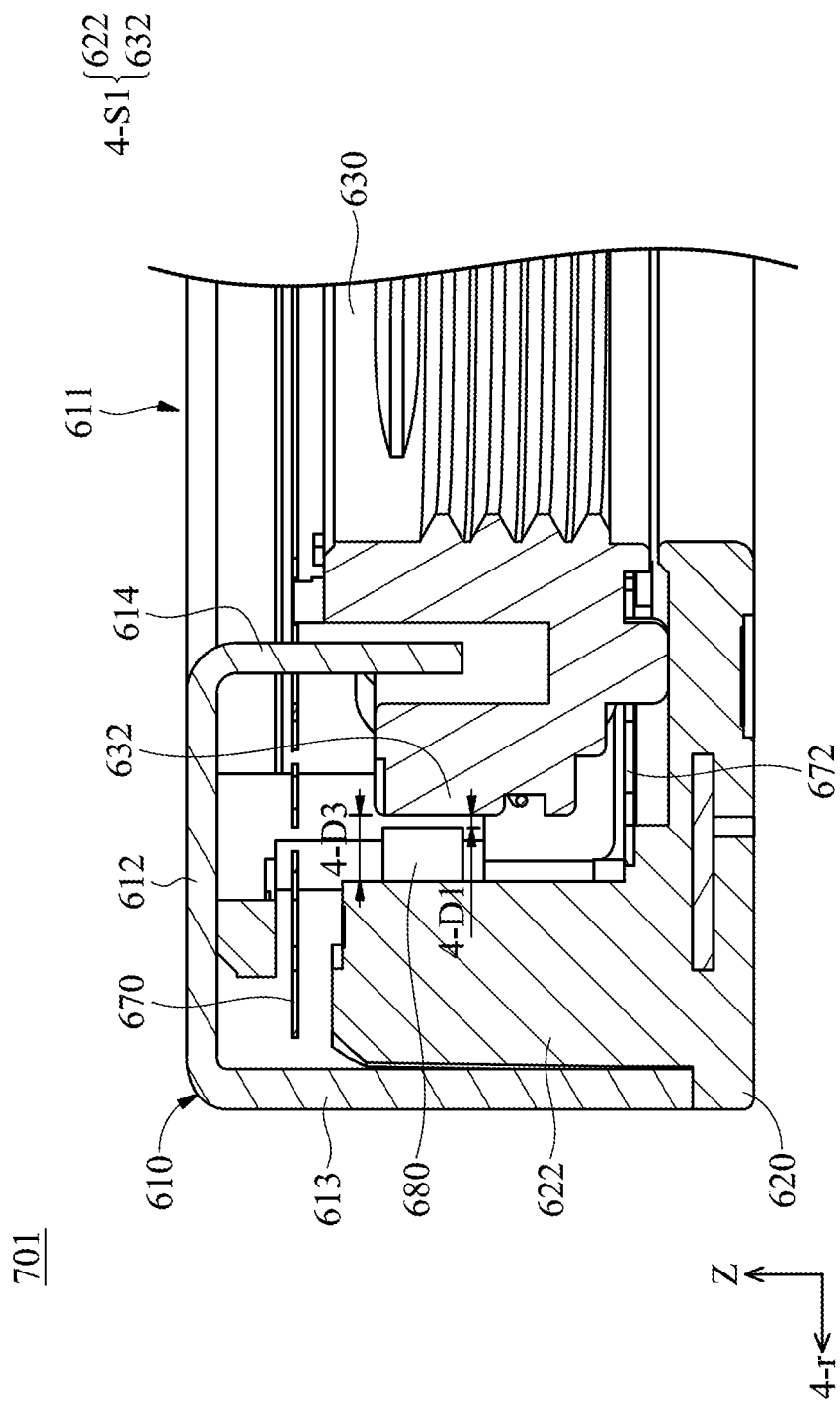
FIG. 6 is a cross-sectional view illustrated along a line 4-B-4-B' in FIG. 4.

FIG. 4 is a top view of some elements of the driving mechanism 701, FIG. 5 is an enlarged view of the area 4-R1 in FIG. 4, and FIG. 6 is a cross-sectional view illustrated along the line 4-B-4-B' in FIG. 4. It should be noted that the case 610 is omitted in FIGS. 4 and 5. In FIG. 6, the case 610 includes a top plate 612, an outer sidewall 613 extended from the edges of the top plate 612 along the main axis 4-O (Z direction), and an inner sidewall 614 extended from the edges of the case opening 611 along the main axis 6-O, wherein the bottom 620 has a column 622 extending to the top plate 612. Furthermore, as shown in FIG. 4, a direction 4-r is defined as a direction that is extending from the main axis 6-O.

In FIGS. 4 to 6, the buffering element 680 may be disposed between the column 622 and the holder 630 (the movable portion 4-M) and have a distance 4-D1 to the protrusion 632, and the buffering element 680 may be in direct contact with the column 622. In other words, the buffering element 680 is in direct contact with the fixed portion 4-F and has a distance to the movable portion 4-M. The buffering element 620 may be an element which can absorb vibration, such as a gel. In some embodiments, a stopping assembly 4-S1 may include the column 622 and the protrusion 632 for limiting the moving range of the movable portion 4-M relative to the fixed portion 4-F, to prevent the movable portion 4-M from being damaged. In some embodiments, the buffering element 680 may include resin, and the case 610 (such as the outer sidewall 613 or the inner sidewall 614) may include metal. As a result, the hardness of the buffering element 680 may be less than the hardness of the case 610 (such as the outer sidewall 613 or the inner sidewall 614). In other embodiments, the bottom 620 also may include metal, so the hardness of the buffering element 680 also may be less than the hardness of the bottom 620 to prevent the case 610 or the bottom 620 from being damaged by the buffering element 680.

In this embodiment, when the holder 630 (a portion of the movable portion 4-M) is static, the buffering element 680 is not in contact with the holder 630, that is, has a distance to the holder 630. As a result, when the movable portion 4-M moves relative to the fixed portion 4-F, the buffering element 680 is not in contact with the movable portion 4-M and the fixed portion 4-F at the same time, so the buffering element 680 does not pulled by the movable portion 4-M and the fixed portion 4-F together at the same time, which makes the buffering element 680 facing a force exceeding its limit. As a result, the buffering element 680 may be prevented from being damaged (such as fractured) when the movable portion 4-M is moving relative to the fixed portion 4-F.

Furthermore, the buffering element 680 has a distance to the holder 630 (a portion of the movable portion 4-M) in this embodiment, so the buffering element 680 can change the resonance frequency of the elements if resonance occurs during the operation of the driving mechanism 701, and the noise created from the resonance may be reduced. Moreover, the movement of the movable portion 4-M relative to the fixed portion 4-F may be prevented from the resonance to improve the performance of the driving mechanism 701.

Moreover, the hardness of the buffering element 680 is less than the thickness of the column 622 of the bottom 620 (a portion of the stopping assembly 4-S1) in some embodiments of the present disclosure. In some embodiments, the column 622 and the buffering element 680 may both include resin, and the column 622 has a different hardness than the buffering element 680. As a result, the column 622 may be prevented from being damaged by the buffering element 680 when the movable portion 4-M moves relative to the fixed portion 4-F, so the durability of the fixed portion 4-F may be enhanced.

Figure 7:
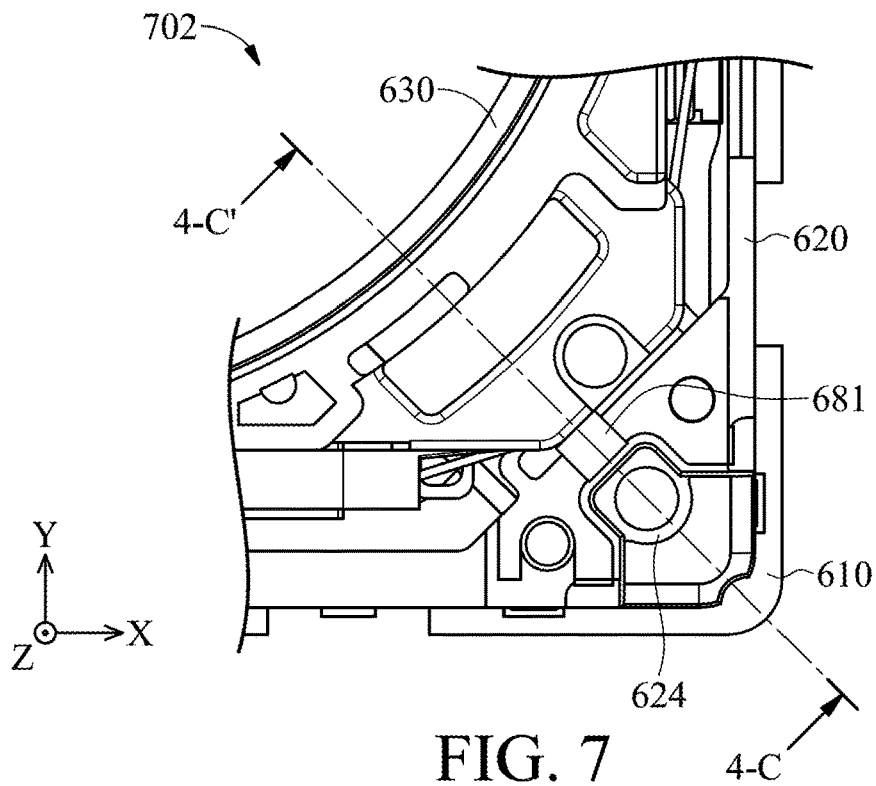
FIG. 7 is a schematic view of a driving mechanism in other embodiments of the present disclosure.
Figure 8:
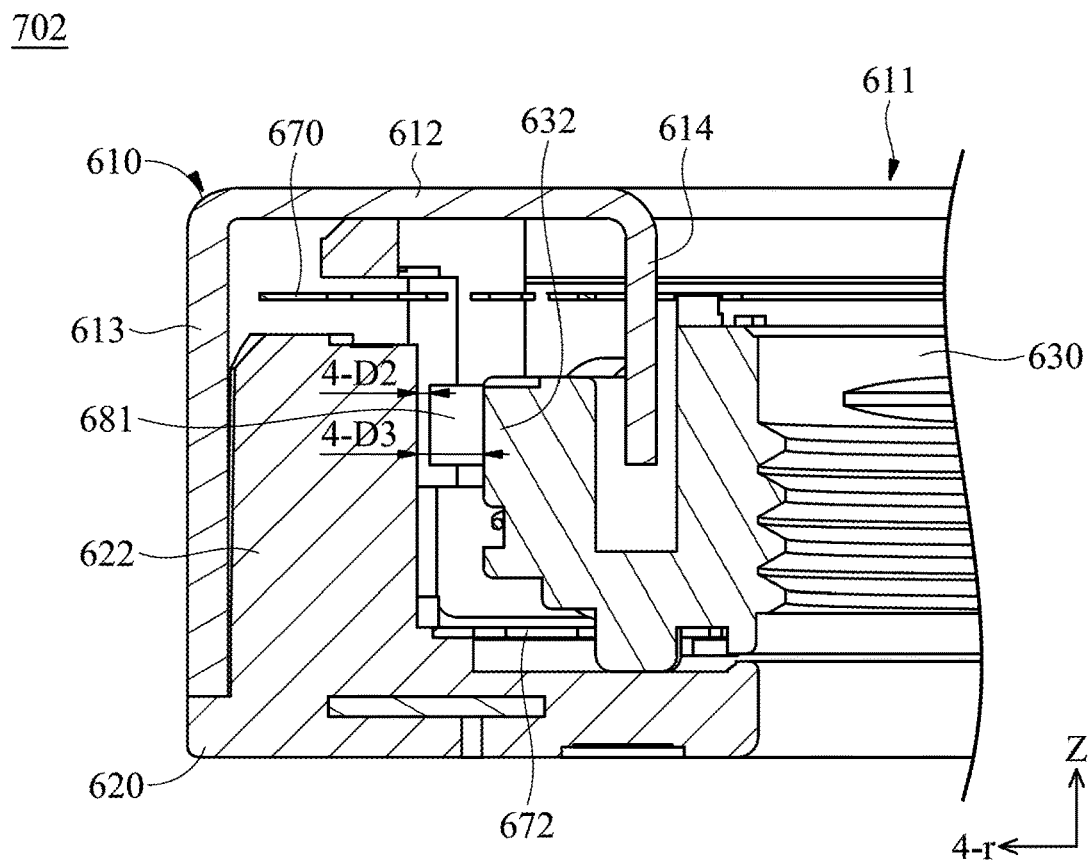
FIG. 8 is a cross-sectional view illustrated along a line 4-C-4-C' in FIG. 7.

FIG. 7 is a schematic view of some elements of a driving mechanism 702 in some embodiments of the present disclosure, and FIG. 8 is a cross-sectional view illustrated along the line 4-C-4-C' in FIG. 7. In FIGS. 7 and 8, the difference between this embodiment to previous embodiments is that the buffering element 681 of the driving mechanism 702 is disposed on the holder 630 (such as in direct contact with the holder 630) and has a distance 4-D2 to the column 622 of the bottom 620. In other words, when the movable portion 4-M is static, the buffering element 681 is disposed on the movable portion 4-M without in contact with the fixed portion 4-F (i.e. has a distance to the fixed portion 4-F). As a result, the buffering element 681 may be prevented from being fractured when the movable portion 4-M moving relative to the fixed portion 4-F.

Furthermore, in FIG. 6, the buffering element 680 partially overlaps the fixed portion 4-F and the movable portion 4-M along the line 4-B-4-B' (i.e. first direction). Furthermore, the shortest distance 4-D3 between the column 622 and the protrusion 632 of the holder 630 is greater than the shortest distance 4-D1 between the buffering element 680 and the protrusion 632 (FIG. 6), or greater than the shortest distance 4-D2 between the buffering element 681 and the column 622 (FIG. 8) in this direction.

In this embodiment, the protrusion 632 may be called as a first stopping element, and the column 622 may be called as a second stopping element, and the stopping assembly 4-S1 may include the protrusion 632 and the column 622. In other words, the shortest distance between the first stopping element and the second stopping element is greater than the shortest distance between the buffering element and the movable portion, or greater than the shortest distance between the buffering element and the fixed portion in the first direction. As a result, the buffering element 680 will be in contact with the movable portion 4-M or the fixed portion 4-F to absorb impact before the first stopping element and the second stopping element collide with each other, so the durability of the driving mechanism 701 may be enhanced.

Figure 9:
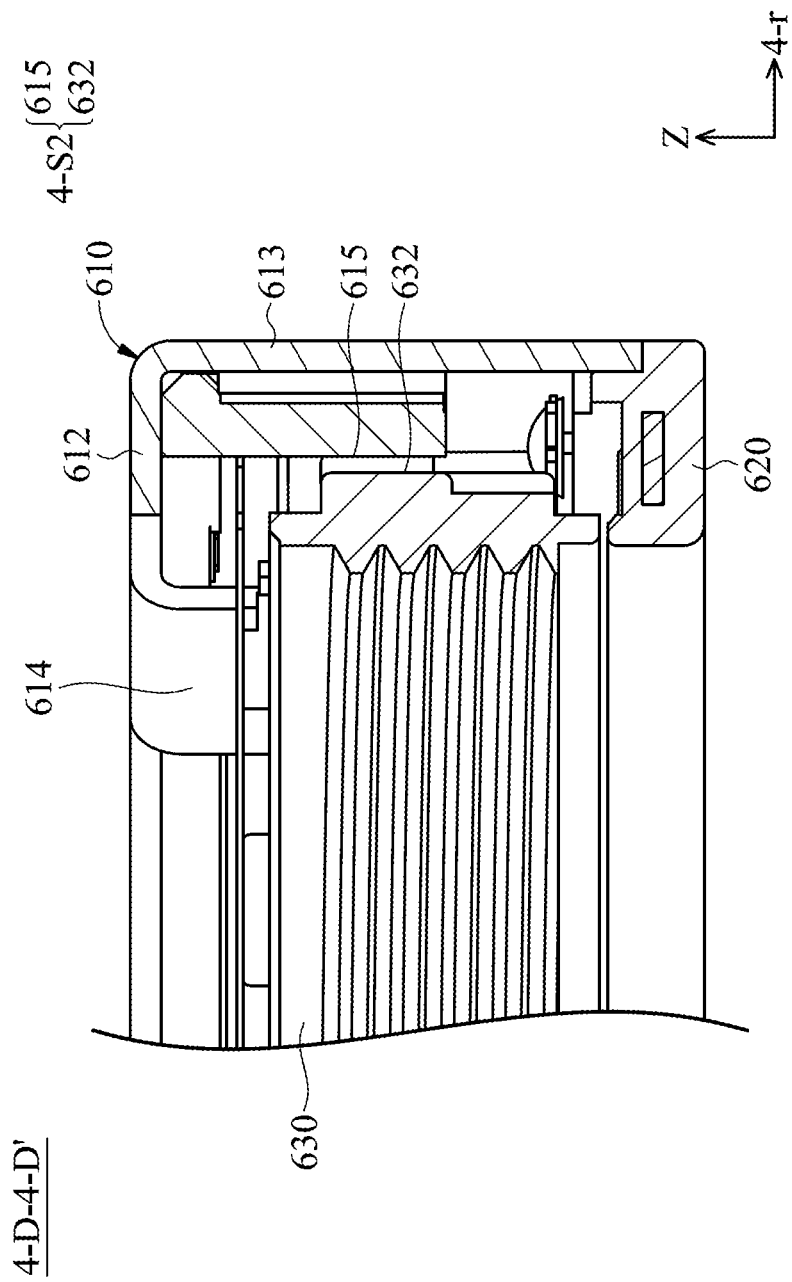
FIG. 9 is a cross-sectional view illustrated along a line 4-D-4-D' in FIG. 4.

FIG. 9 is a cross-sectional view illustrated along the line 4-D-4-D' in FIG. 4. In FIG. 9, the protrusion 632 on the holder 630 (movable portion 4-M) may be called as the first stopping element, and a protrusion 615 which corresponds to the protrusion 632 may be disposed on the case 610 (fixed portion 4-M), wherein the protrusion 615 may be called as the second stopping element on the movable portion 4-M, and the protrusions 615 and 632 may be a portion of the stopping assembly 4-S2. In this embodiment, the hardness of the buffering element 680 may be different than the hardness of the protrusion 615 and the hardness of the protrusion 632. For example, the hardness of the buffering element 680 may be less than the hardness of the protrusion 615 and the hardness of the protrusion 632, so the elements in the driving mechanism 701 may collide with the softer buffering element 680 prior to collide with other elements, to prevent other elements from being damaged during the operation of the driving mechanism 701.

Figure 10:
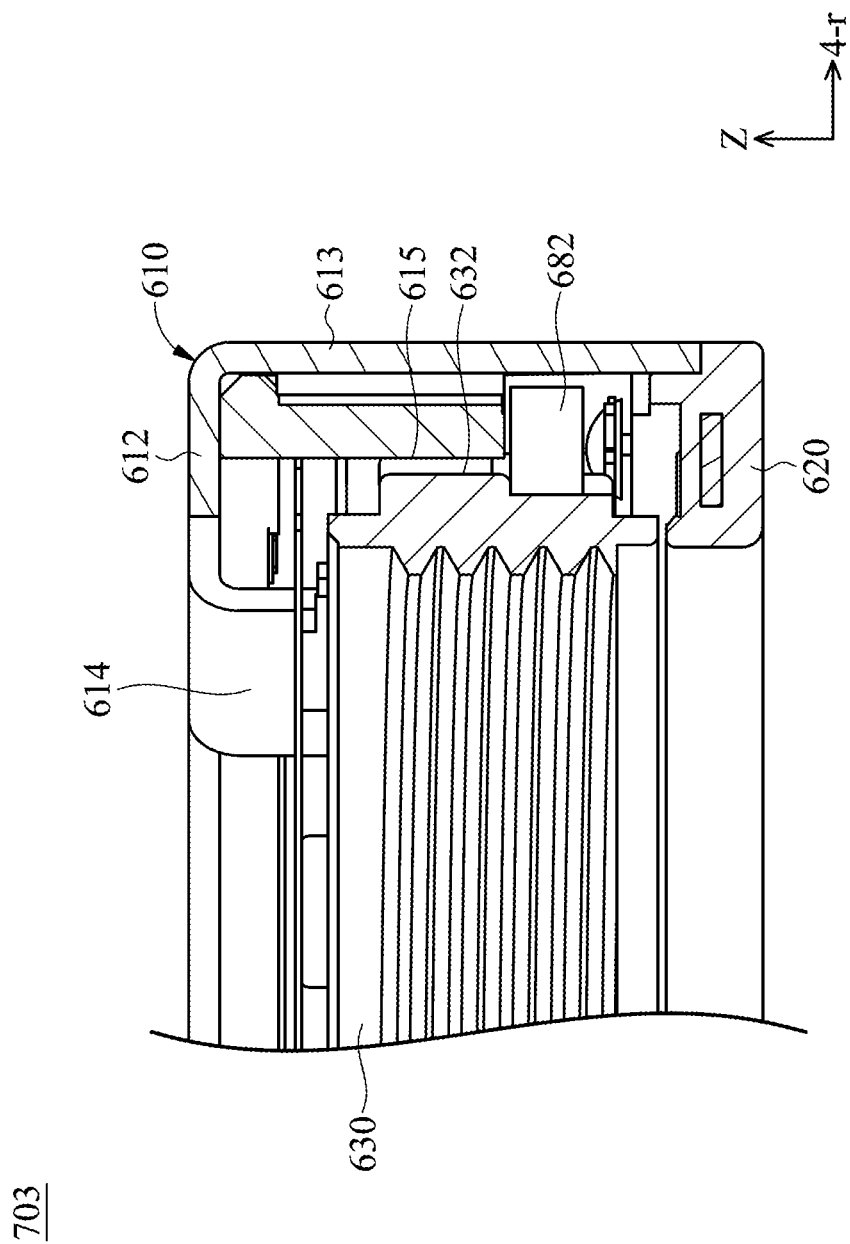
FIG. 10 is a cross-sectional view of a driving mechanism in an embodiment of the present disclosure.

FIG. 10 is a cross-sectional view of a driving mechanism 703 in another embodiment of the present disclosure. The different between the driving mechanisms 703 and 701 is that the buffering element 682 of the driving mechanism 703 is disposed between the outer sidewall 613 and the holder 630 (movable portion 4-M), and may be disposed on the holder 630. As a result, the movable portion 4-M and the fixed portion 4-F may be prevented from colliding with each other. Moreover, the buffering element 682 may be extended under the protrusion (arranged in Z direction) to further prevent the elements from colliding in this embodiment.

Figure 11:
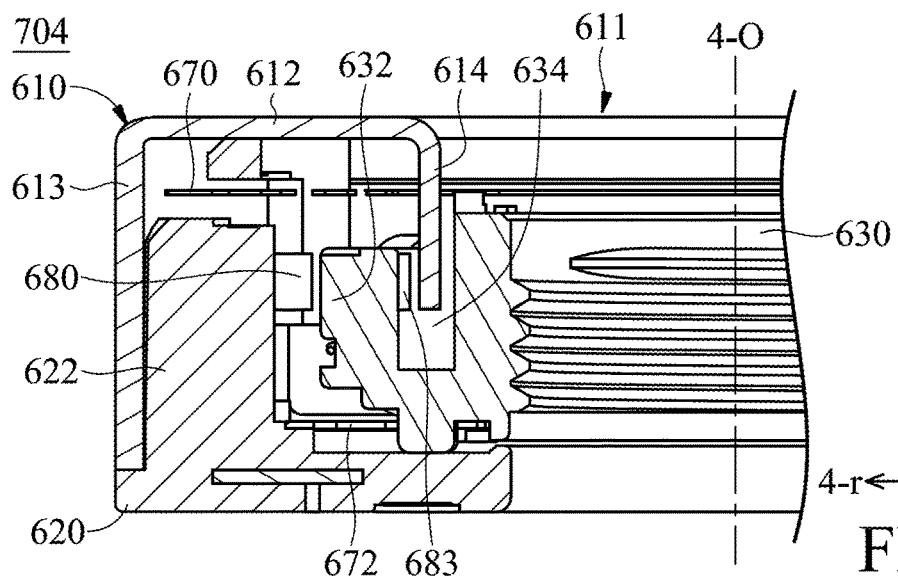
FIGS. 11 to 13 are cross-sectional views of driving mechanisms in some embodiments of the present disclosure.
Figure 12:
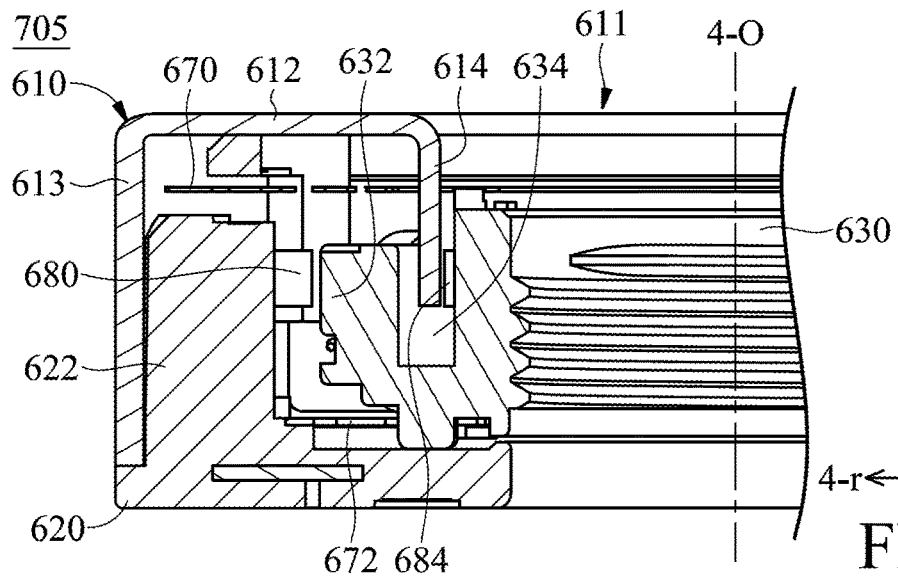
Figure 13:
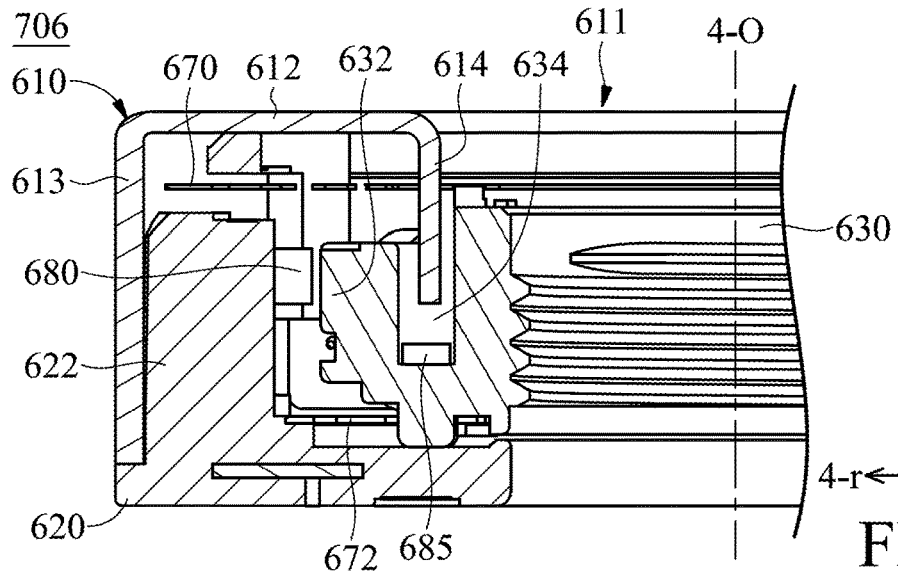

FIGS. 11 to 13 are cross-sectional views of driving mechanisms 704, 705 and 706, respectively. The difference between these embodiments to the previous embodiments is that a buffering element may be provided between the holder 630 and the inner sidewall 614 of the case 610. For example, the holder 630 may have a recess 634, and the inner sidewall 614 of the frame 610 may be disposed in the recess 634. The buffering element, such as the buffering element 683 in FIG. 11, the buffering element 684 in FIG. 12, or the buffering element 685 in FIG. 13, may be disposed in the recess 634. In particular, the buffering element 683 may be disposed on the outer side of the inner sidewall 614 (the side facing away the main axis 6-O), and the buffering element 684 may be disposed on the inner side of the inner sidewall 614 (the side adjacent to the main axis 6-O). Furthermore, the holder 630 may move relative to the fixed portion 4-F in Z direction, so the buffering element 685 may arrange with the inner sidewall 614 in Z direction in FIG. 13. As a result, the holder 630 may be prevented from colliding with the case 610 in various directions.

Figure 14:
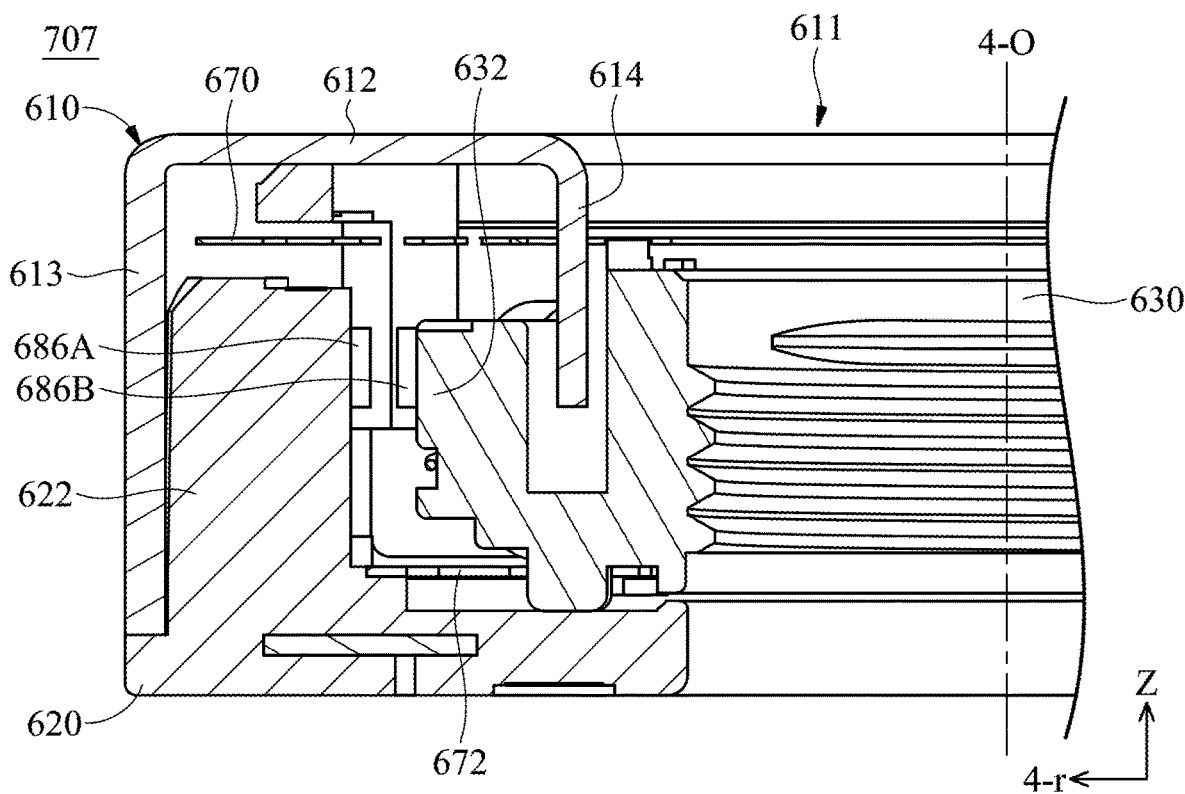
FIGS. 14 and 15 are cross-sectional views of driving mechanisms in some embodiments of the present disclosure.
Figure 15:
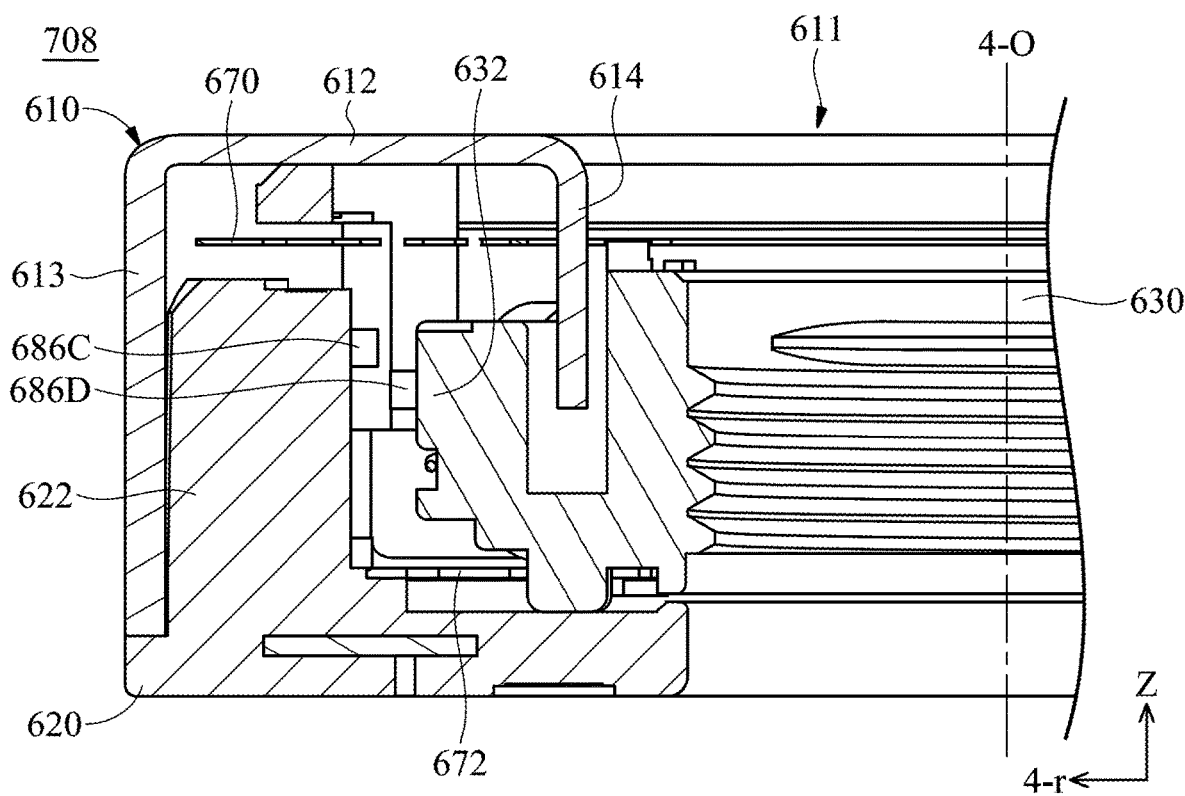

FIGS. 14 and 15 are cross-sectional views of the driving mechanisms 707 and 708 in some embodiments, wherein the driving mechanisms 707 and 708 include a plurality of buffering elements disposed between the column 622 and the protrusion 632. In FIG. 14, the driving mechanism 707 includes a buffering element 686A (first buffering element) disposed on the bottom 620 and a buffering element 686B (second buffering element) disposed on the holder 630, and a distance is formed between the buffering elements 686A and 686B. Furthermore, in FIG. 15, the driving mechanism 708 includes a buffering element 686C (first buffering element) disposed on the bottom 620 and a buffering element 686D (second buffering element) disposed on the holder 630, and a distance is formed between the buffering elements 686C and 686D.

In FIG. 14, the buffering element 686A at least partially overlaps the buffering element 686B of the driving mechanism 707 in a direction that is perpendicular to the main axis 6-O (a radius direction (direction 4-r) using the main axis 6-O as a center of circle). As a result, a plurality of buffering elements may be used for further buffering when the movable portion 4-M moving in the direction 4-r relative to the fixed portion 4-F, so the elements of the driving mechanism 707 may be further prevented from being damaged due to collision during the operation of the driving mechanism 707. On the other hand, in FIG. 15, the buffering element 686C does not overlap the buffering element 686D of the driving mechanism 708 in a direction that is perpendicular to the main axis 6-O (direction 4-r). As a result, collision that may occur at different positions (such as occur at different heights in Z direction) may be further prevented to protect other elements of the driving mechanism 708.

Figure 16:
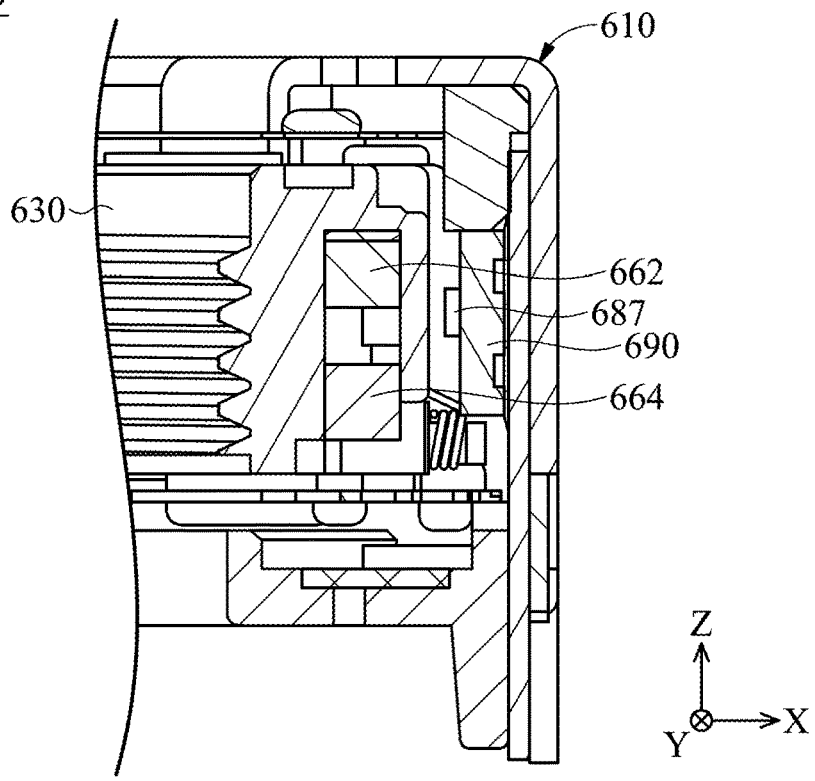
FIGS. 16 and 17 are cross-sectional views of driving mechanisms in some embodiments of the present disclosure.
Figure 17:
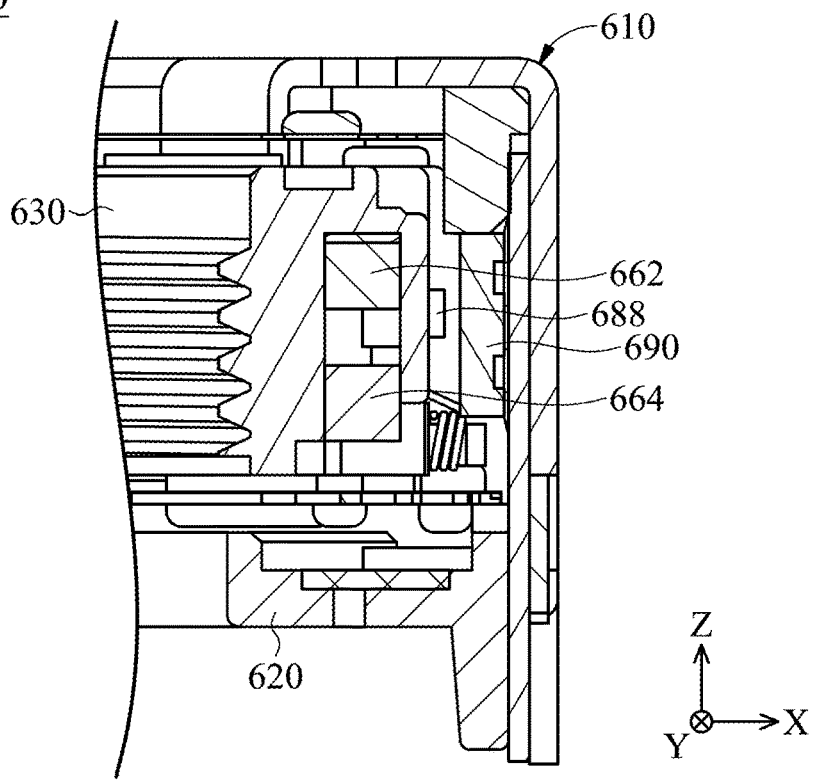

FIGS. 16 and 17 are cross-sectional views of driving mechanisms 709 and 710, respectively. The driving mechanisms 709 and 710 further includes a position sensor 690, which may be, for example, a Hall effect sensor, a MR sensor, or a fluxgate sensor to detect the magnetic element 660 on the frame 650 to get the offset value of the frame 650 and the holder 630 relative to the bottom 620.

The position sensor 690 may be disposed on the fixed portion 4-F (such as disposed on the case 610) to detect the movement of the movable portion 4-M. Furthermore, in this embodiment, a buffering element may be provided to protect the position sensor 690. For example, as shown in FIG. 16, the driving mechanism 709 includes a buffering element 687 disposed on a side of the position sensor 690 that corresponds to the holder 630. Moreover, as shown in FIG. 17, the driving mechanism 710 includes a buffering element 688 disposed on a side of the position sensor 690 corresponding to the holder 630.

It should be noted that when the holder 630 is static, the buffering element 687 is not in contact with the movable portion 4-M (holder 630), and the buffering element 688 is not in contact with the position sensor 690, as shown in FIGS. 16 and 17. As a result, the buffering elements 687 and 688 may be prevented from being in contact with the holder 630 and the position sensor 690 at the same time, so the durability of the buffering elements 687 and 688 may be enhanced. Furthermore, the buffering elements 687 or 688 may prevent the holder 630 from directly colliding with the position sensor 690, to protect the position sensor 690 during the operation. Moreover, as shown in FIG. 16, resonance of the position sensor 690 during the operation of the driving mechanism 709 may be prevented from occurring by providing the buffering element 687 on the position sensor 690, so accuracy of the position sensor 690 may not be affected.

Figure 18:
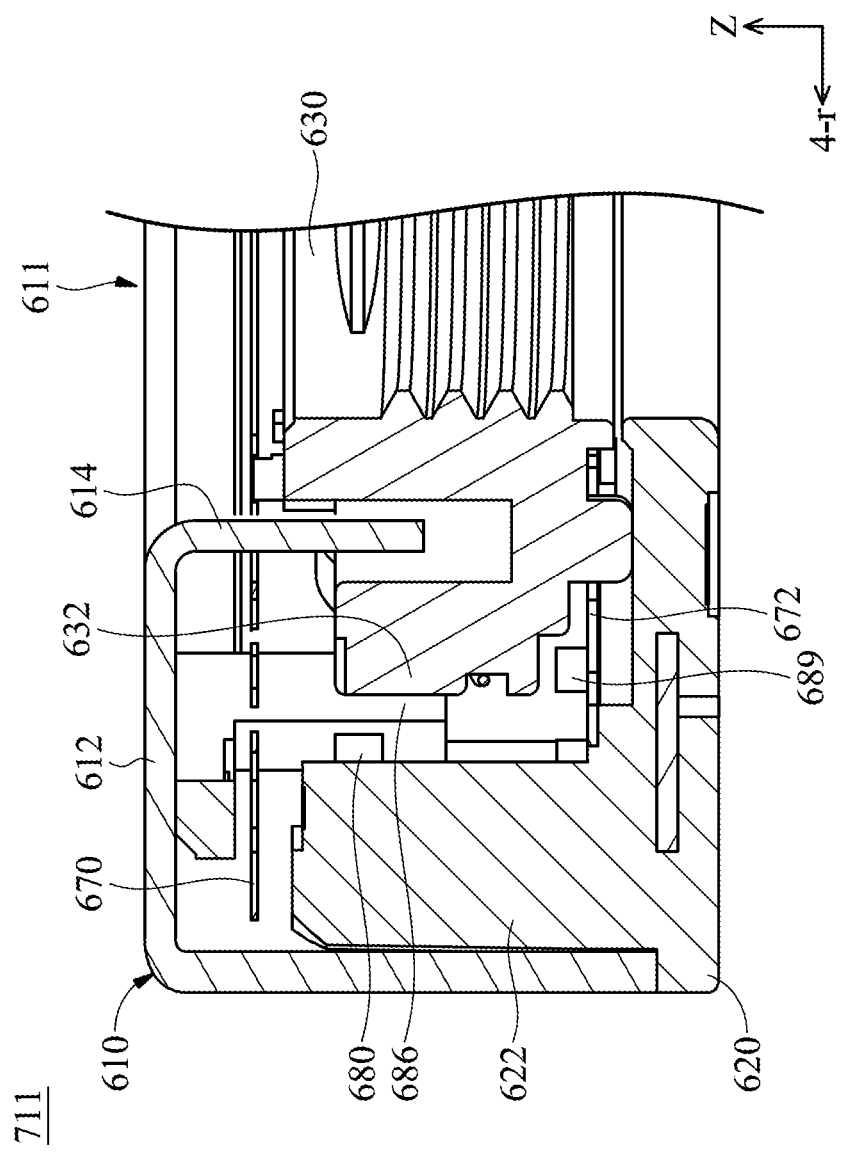
FIG. 18 is a cross-sectional view of a driving mechanism in some embodiments of the present disclosure.

FIG. 18 is a cross-sectional view of a driving mechanism 711 in some embodiments of the present disclosure. In FIG. 18, the driving mechanism 711 further includes a buffering element 689 disposed on the second resilience element 672, and the buffering element 689 may arrange with the movable portion 4-M (such as the holder 630) in Z direction. In some embodiments, the buffering element 689 is in direct contact with the second resilient element 672. As a result, the second resilient element 672 or the movable portion 4-M may be protected in Z direction, and resonance of the elements in the driving mechanism 711 may be prevented from occurring during the operation of the driving mechanism 711.

In summary, a driving mechanism for driving an optical element is provided in the present disclosure. Because the buffering element is only disposed on either the movable portion or the fixed portion, the lifetime of the buffering element may be increased, and collision or resonance of the elements in the driving mechanism may be prevented from occurring, thereby enhancing the durability and performance of the driving mechanism.

Although the buffering elements 680, 681, 682, 683, 684, 685, 686A, 68B, 686C, 686D, 687, 688, and 689 are illustrated in different embodiments, but any two (or more) of the buffering elements 680, 681, 682, 683, 684, 685, 686A, 68B, 686C, 686D, 687, 688, and 689 may be disposed in an identical driving mechanism without exceeding the scope of the present disclosure.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. A driving mechanism, comprising:
    a fixed portion;
    a movable portion movably connected to the fixed portion for holding an optical element having a main axis;
    a driving assembly disposed in the fixed portion for moving the movable portion relative to the fixed portion;
    a buffering element disposed between the movable portion and the fixed portion; and
    a stopping assembly disposed on the fixed portion and/or the movable portion to limit a range of motion of the movable portion relative to the fixed portion, wherein the buffering element is not in contact with the movable portion or the fixed portion when the movable portion is static, and a hardness of the buffering element is less than a hardness of the stopping assembly.

2. The driving mechanism as claimed in claim 1, wherein both the stopping assembly and the buffering element comprise resin, and the hardness of the stopping assembly is different than the hardness of the buffering element.

3. The driving mechanism as claimed in claim 1, wherein the stopping assembly comprises:
    a first stopping element disposed on the movable portion; and
    a second stopping element disposed on the fixed portion, wherein in a first direction, the buffering element partially overlaps the fixed portion and the movable portion, the buffering element is disposed on the fixed portion, and a shortest distance between the first stopping element and the second stopping element is greater than a shortest distance between the buffering element and the movable portion.

4. The driving mechanism as claimed in claim 1, wherein the stopping assembly comprises:
    a first stopping element disposed on the movable portion; and
    a second stopping element disposed on the fixed portion, wherein in a first direction, the buffering element partially overlaps the fixed portion and the movable portion, the buffering element is disposed on the movable portion, and the shortest distance between the first stopping element and the second stopping element is greater than a shortest distance between the buffering element and the fixed portion.

5. The driving mechanism as claimed in claim 1, wherein the fixed portion further comprises:
    a case comprising a top plate and a sidewall extending from edges of the top plate along the main axis; and
    a bottom comprising a column extending to the top plate, wherein the buffering element is disposed between the column and the movable portion, and the hardness of the buffering element is less than the hardness of the bottom.

6. The driving mechanism as claimed in claim 1, wherein the fixed portion further comprises:
    a case comprising a top plate and a sidewall extending from edges of the top plate along the main axis; and
    a bottom affixed to the case, wherein the buffering element is disposed between the sidewall and the movable portion, the buffering element comprises resin, the sidewall comprises metal, and the hardness of the buffering element is less than the hardness of the sidewall.

7. The driving mechanism as claimed in claim 1, wherein the fixed portion further comprises:
    a case comprising a top plate and a sidewall extending from edges of the top plate along the main axis; and
    a bottom affixed to the case, wherein the top plate has an opening, and the case further comprises an inner sidewall extending from an edge of the opening to the movable portion, the buffering element comprises resin, the inner sidewall comprises metal, and the hardness of the buffering element is less than the hardness of the inner sidewall.

8. The driving mechanism as claimed in claim 7, wherein the inner sidewall and the buffering element are arranged along the main axis.

9. The driving mechanism as claimed in claim 1, further comprising a position sensor, wherein the buffering element is disposed between the position sensor and the movable portion, or between the position sensor and the fixed portion.

10. The driving mechanism as claimed in claim 9, wherein the buffering element is in direct contact with the position sensor, and a distance is formed between the buffering element and the fixed portion or the movable portion when the movable portion is static.

11. The driving mechanism as claimed in claim 9, wherein the buffering element is in direct contact with the fixed portion or the movable portion, and a distance is formed between the buffering element and the position sensor when the movable portion is static.

12. The driving mechanism as claimed in claim 1, wherein the buffering element comprises:
    a first buffering element disposed on the fixed portion; and
    a second buffering element disposed on the movable portion, wherein a distance is formed between the fixed buffering element and the second buffering element.

13. The driving mechanism as claimed in claim 12, wherein the first buffering element partially overlaps the second buffering element in a direction that is perpendicular to the main axis.

14. The driving mechanism as claimed in claim 12, wherein the first buffering element does not overlap the second buffering element in a direction that is perpendicular to the main axis.

15. The driving mechanism as claimed in claim 1, further comprising a resilient element connecting the movable portion and the fixed portion, and the buffering element is disposed on the resilient element.

* * * * *